US012763985B2

(12) United States Patent
Shi et al.

(10) Patent No.: US 12,763,985 B2
(45) Date of Patent: Oct. 13, 2026

(54) CONTROLLERS, CONTROLLING METHODS, AND CONTROLLING SYSTEMS FOR SMART HOMES

(71) Applicant: COMMANDER SMART HOME, INC., Lisle, IL (US)

(72) Inventors: Haofei Shi, Fuzhou (CN); Xiaoda Hu, Fuzhou (CN); Daojie Lin, Fuzhou (CN)

(73) Assignee: COMMANDER SMART HOME, INC., Lisle, IL (US)

( * ) Notice: Subject to any disclaimer, the term of this patent is extended or adjusted under 35 U.S.C. 154(b) by 364 days.

(21) Appl. No.: 18/518,938

(22) Filed: Nov. 24, 2023

(65) Prior Publication Data

US 2025/0097067 A1 Mar. 20, 2025

(30) Foreign Application Priority Data

Sep. 18, 2023 (CN) ......................... 202311200012.4

(51) Int. Cl.

*H04L 12/28* (2006.01)
*G06F 3/04847* (2022.01)
*H04L 67/12* (2022.01)
*H04L 67/50* (2022.01)

(52) U.S. Cl.

CPC ........ *H04L 12/282* (2013.01); *G06F 3/04847* (2013.01); *H04L 67/12* (2013.01); *H04L 67/535* (2022.05); *H04L 2012/285* (2013.01)

(58) Field of Classification Search

CPC ..... H04L 12/282; H04L 67/12; H04L 67/535; H04L 2012/285; G06F 3/04847
See application file for complete search history.

(56) References Cited

U.S. PATENT DOCUMENTS

D371,791 S 7/1996 Patton
D371,792 S 7/1996 Patton
D430,143 S 8/2000 Renk
D518,030 S 3/2006 Lin (Continued)

FOREIGN PATENT DOCUMENTS

CN 308912719 S 10/2024
CN 308952497 S 11/2024
KR 301281920.0000 S 11/2024

OTHER PUBLICATIONS

"Learn how to control your Nest products with Amazon Alexa" www.google.com <https://web.archive.org/web/20190722000910/https://support.google.com/googlenest/answer/9325080?hl=en> (Year: 2019).*

(Continued)

*Primary Examiner* — Jinsong Hu
*Assistant Examiner* — Justin Barry
(74) *Attorney, Agent, or Firm* — METIS IP LLC

(57) ABSTRACT

Embodiments of the present disclosure relates to the field of smart homes, specifically relating to a controller, a control method, and a control system for a smart home. The controller includes an interaction module and a communication module. The interaction module includes at least one of a button unit and a sliding unit. The controller is configured to: obtain a control command based on the interaction module, and upload the control command to a control server via the communication module, wherein the control command is configured to control a target smart home device.

18 Claims, 5 Drawing Sheets

(56) References Cited

U.S. PATENT DOCUMENTS

| | | | | |
|---|---|---|---|---|
| D520,962 | S | 5/2006 | Seal et al. | |
| D542,234 | S | 5/2007 | Shimizu | |
| D595,670 | S | 7/2009 | Glassman et al. | |
| D596,622 | S | 7/2009 | Lee | |
| D618,667 | S | 6/2010 | Chiu | |
| D627,306 | S | 11/2010 | Charleux | |
| D632,265 | S | 2/2011 | Choi et al. | |
| D636,380 | S | 4/2011 | Valeur | |
| D639,783 | S | 6/2011 | Murayama et al. | |
| D650,364 | S | 12/2011 | Kim et al. | |
| D654,031 | S | 2/2012 | Seki et al. | |
| D685,790 | S | 7/2013 | Tang | |
| D700,904 | S | 3/2014 | Miller et al. | |
| D726,161 | S | 4/2015 | Howard et al. | |
| D738,858 | S | 9/2015 | Tuhkanen | |
| D766,844 | S | 9/2016 | Turksu et al. | |
| D794,444 | S | 8/2017 | Chen | |
| D802,589 | S | 11/2017 | Fisher | |
| D812,577 | S | 3/2018 | Turksu et al. | |
| D834,002 | S | 11/2018 | Bergfeldt et al. | |
| D834,560 | S | 11/2018 | Hardi | |
| D845,931 | S | 4/2019 | Kosuge et al. | |
| D857,635 | S | 8/2019 | Prevoteau et al. | |
| D858,463 | S | 9/2019 | Nien et al. | |
| D863,258 | S | 10/2019 | Song et al. | |
| D867,342 | S | 11/2019 | Afshar Bakooshli | |
| D867,343 | S | 11/2019 | Afshar Bakooshli | |
| D868,036 | S | 11/2019 | Sohn et al. | |
| D877,149 | S | 3/2020 | Johnston | |
| D879,053 | S | 3/2020 | Yu | |
| D900,821 | S | 11/2020 | Johnston | |
| D910,598 | S | 2/2021 | Kass et al. | |
| D928,728 | S | 8/2021 | Bould et al. | |
| D959,409 | S | 8/2022 | Desagre et al. | |
| D961,425 | S | 8/2022 | Prevoteau et al. | |
| D967,062 | S | 10/2022 | Yang et al. | |
| D971,176 | S | 11/2022 | Nakagawa et al. | |
| D971,751 | S | 12/2022 | Harvey | |
| D976,221 | S | 1/2023 | Edwards | |
| D983,786 | S | 4/2023 | Errmann | |
| D989,037 | S | 6/2023 | Zeng | |
| D1,005,266 | S | 11/2023 | Zheng et al. | |
| D1,006,739 | S | 12/2023 | Li | |
| D1,009,832 | S | 1/2024 | Valeur | |
| D1,036,550 | S | 7/2024 | Clarkson et al. | |
| D1,037,042 | S | 7/2024 | Yang | |
| D1,038,092 | S | 8/2024 | Suzuki | |
| D1,040,136 | S | 8/2024 | Booth et al. | |
| D1,051,877 | S | 11/2024 | Deurwaarder | |
| 2013/0173064 | A1* | 7/2013 | Fadell | H04L 67/10 700/276 |
| 2013/0338839 | A1* | 12/2013 | Rogers | F24F 11/58 700/278 |
| 2015/0159904 | A1* | 6/2015 | Barton | F21V 23/005 236/1 C |
| 2016/0223216 | A1* | 8/2016 | Buda | G05B 15/02 |
| 2022/0052865 | A1* | 2/2022 | Zhu | G05B 15/02 |

OTHER PUBLICATIONS

"Smart Home Controller + Bluetooth Controller—Works with Alexa, Google Home, Home Assistant, SmartThings, lights, thermostats and more—Programmable & Customizable Buttons, (Snow Pearl) ", Web page < https://a.co/d/3POoail>, Oct. 17, 2023.

"Smart Button, 5-Keys Smart Switch, Scene Controller, Compatible with Apple Homekit, Automatically Trigger Accessories & Scenes-Thread (iOS 17.4 or Later is Required) ", Web page <https://a.co/d/7caNfqr>, Jul. 7, 2023.

"MoesGo WiFi IR Control Hub for Smart Appliances via Voice and Smart Life/Tuya App, Compatible with Amazon Echo and Google Home ", Web page <https://a.co/d/9k1F4Zd>, Mar. 16, 2020.

* cited by examiner

500

CONTROLLERS, CONTROLLING METHODS, AND CONTROLLING SYSTEMS FOR SMART HOMES

CROSS-REFERENCE TO RELATED APPLICATIONS

This application claims priority to Chinese Patent Application No. 202311200012.4 filed on Sep. 18, 2023, the entire contents of which are hereby incorporated by reference.

TECHNICAL FIELD

The present disclosure relates to the field of smart homes, specifically relating to a controller, a control method, and a control system for a smart home.

BACKGROUND

A smart home integrates facilities related to home life based on residence as a platform by utilizing technologies such as comprehensive wiring technology, network communication technology, and security prevention technology, to create an efficient management system for residential facilities and household scheduling tasks, thereby enhancing home safety and convenience.

However, as a count of indoor smart home devices increases, users face cumbersome operations when they need to control a specific smart home device. For example, the users first need to select a target smart home device from a multitude of options. Therefore, there is a need for a control method that simplifies these operations.

SUMMARY

Some embodiments of the present disclosure provide a controller for a smart home. The controller includes an interaction module and a communication module. The interaction module includes at least one of a button unit and a sliding unit, and the controller is configured to: obtain a control command based on the interaction module, and upload the control command to a control server via the communication module, wherein the control command is configured to control a target smart home device.

Some embodiments of the present disclosure provide a control method for a smart home, which is performed by a controller. The control method includes determining a control command based on operational data of a user, wherein the operational data includes at least one of sliding data and click data and the control command is configured to control a target smart home device, and uploading the control command to a control server.

Some embodiments of the present disclosure further provide a control method for a smart home, which is executed by a control server. The control method includes formatting a control command uploaded by a controller to obtain command data, wherein the command data is configured to control a target smart home device and the control command is determined based on operational data of a user, and transmitting the command data to a collaborative server so that the collaborative server issues the command data to the target smart home device.

Some embodiments of the present disclosure further provide a control system for a smart home. The control system includes a controller, a control server, a collaborative server, a smart home cloud server, and a plurality of smart home devices connected sequentially, wherein the controller is configured to obtain a control command and upload the control command to the control server; the control server is configured to format the control command to obtain command data and transmit the command data to the collaborative server; the collaborative server is configured to transmit the command data to the smart home cloud server; the smart home cloud server is configured to, based on the command data, control the plurality of smart home devices to execute a responsive operation; and the plurality of smart home devices are configured to feedback a control result to the smart home cloud server based on an execution result of the responsive operation.

BRIEF DESCRIPTION OF THE DRAWINGS

The present disclosure will be further illustrated by way of exemplary embodiments, which will be described in detail through the accompanying drawings. These embodiments are not limiting, and in these embodiments the same numbering indicates the same structure, wherein.

DETAILED DESCRIPTION

Figure 1:
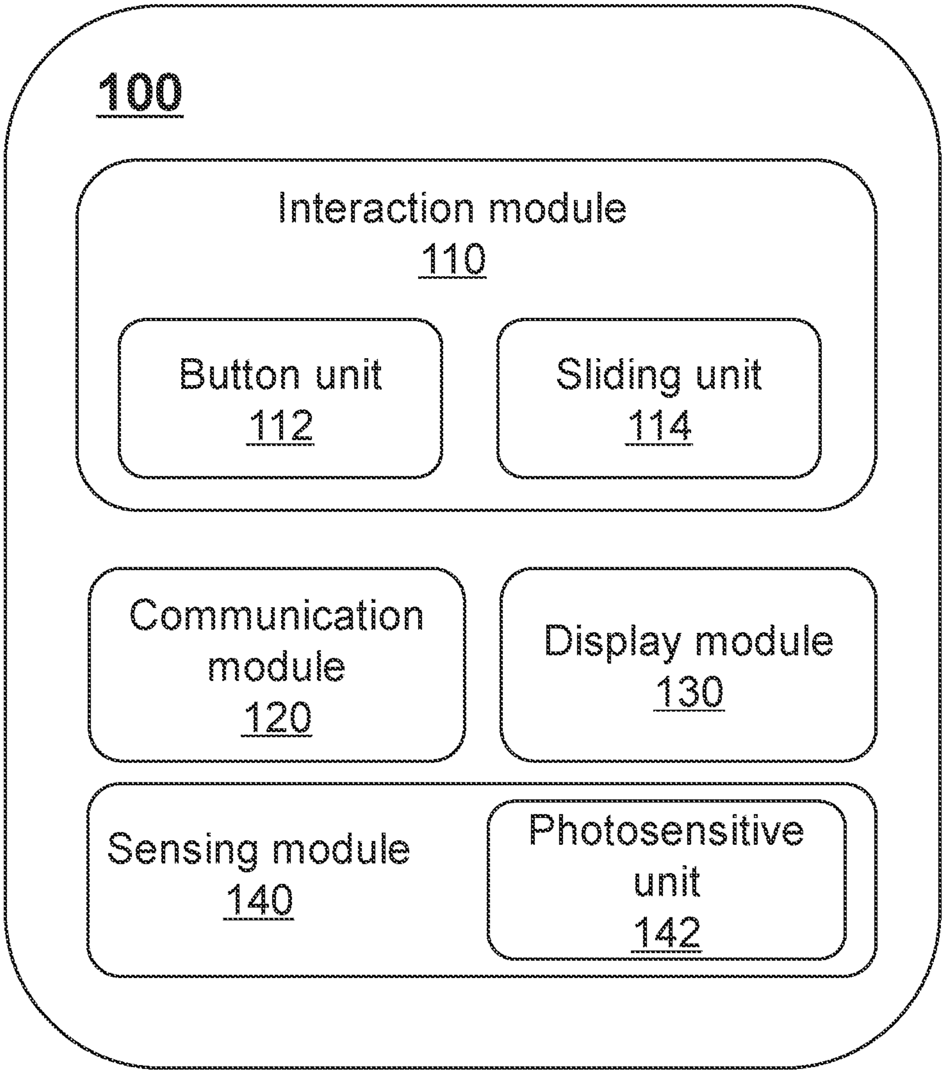
FIG. 1 is a block diagram of a controller for a smart home according to some embodiments of the present disclosure.

In order to provide a clearer understanding of the technical solutions of the embodiments described in the present disclosure, a brief introduction to the drawings required in the description of the embodiments is given below. It is evident that the drawings described below are merely some examples or embodiments of the present disclosure, and for those skilled in the art, the present disclosure may be applied to other similar situations without exercising creative labor, unless otherwise indicated or stated in the context, the same reference numerals in the drawings represent the same structures or operations.

It should be understood that the terms "system," "device," "unit," and/or "module" used in the present disclosure are used to distinguish different components, elements, parts, or assemblies at different levels. However, if other words may achieve the same purpose, they may be replaced by other expressions.

As shown in the present disclosure and the claims, unless explicitly indicated otherwise in the context, words such as "one," "a," "a kind of," and/or "the" do not specifically denote the singular form and may also include the plural form. In general, the terms "comprising" and "including" only suggest the inclusion of steps and elements that have been explicitly identified, and these steps and elements do not constitute an exclusive listing; methods or devices may also include other steps or elements.

Flowcharts are used in the present disclosure to illustrate the steps performed by the system according to the embodiments of the present disclosure. It should be understood that the operations mentioned earlier or later are not necessarily executed in a precise sequence. Instead, they may be processed in reverse order or simultaneously. Other operations may also be added to these processes or certain steps may be removed from these processes.

In order to simplify operations of a smart home, some embodiments of the present disclosure provide a controller and a control method for the smart home. A user may conveniently operate the entire smart home only through manipulation of the controller, which has a smaller form factor, does not require external power, and has a long battery life.

Figure 2:
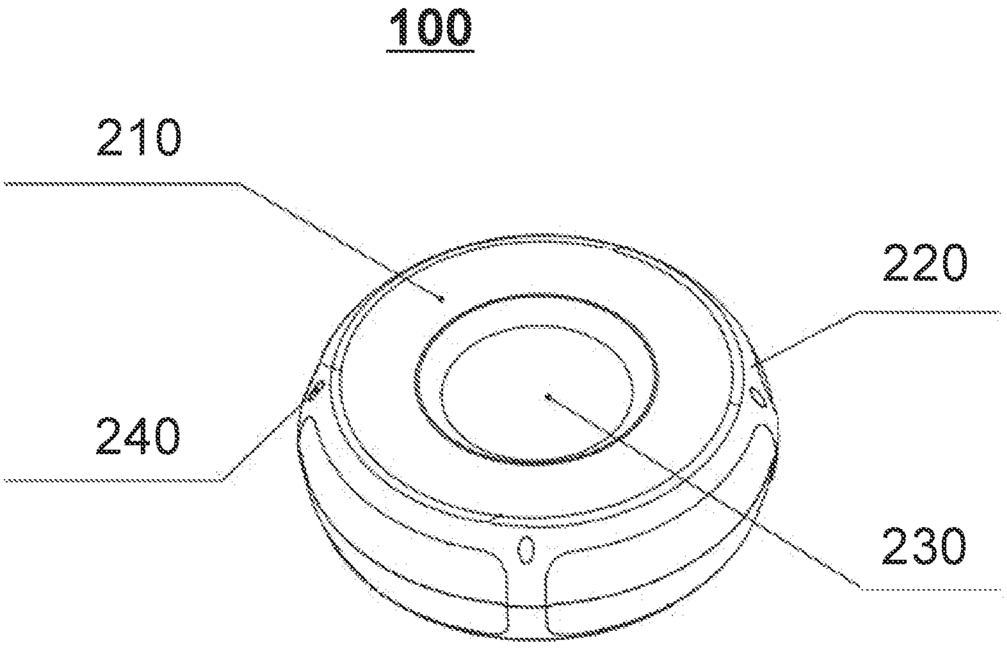
FIG. 2 is a schematic diagram of a structure of a controller for a smart home according to some embodiments of the present disclosure.

FIG. 1 is a block diagram of a controller for a smart home according to some embodiments of the present disclosure. FIG. 2 is a schematic diagram of a structure of the controller for the smart home according to some embodiments of the present disclosure.

Referring to FIG. 1, a controller 100 may include an interaction module 110, a communication module 120, a display module 130, and a sensing module 140.

The interaction module 110 is a component used for human-machine interaction between the user and the controller 100. In some embodiments, the interaction module 110 may include at least one of a button unit 112 and a sliding unit 114. In some embodiments, the button unit 112 and the sliding unit 114 may be set to be implemented by a same device, for example, a rotary ring 210. For more details about the rotary ring 210, please refer to the description related to FIG. 2 below.

In some embodiments, the interaction unit may also include other functional units, for example, a gesture acquisition unit, an eye-tracking unit, etc.

In some embodiments, the controller 100 may obtain a control command based on the interaction module 110. The control command is configured to control a target smart home device, and the control command may be generated based on interaction content between the user and the interaction module 110.

In some embodiments, the control command may be determined based on an operation type (e.g., clicking, sliding, etc.) of the user and an operation parameter (e.g., a count of clicks, a sliding length, etc.) of the user. For example, the control command may indicate an operation action, e.g., turning on light, adjusting air conditioning temperature, etc.

The target smart home device refers to one or more smart home devices that the user wishes to control or operate among a plurality of smart home devices. In some embodiments, the target smart home device may be selected by the user from the plurality of smart home devices through the interaction module 110. For example, when the user wants to adjust temperature of an air conditioner, the target smart home device may be a corresponding air conditioner. When the user wants to set as a sleep mode in room (including operations e.g., turning off a light, closing a curtain, activating surveillance, etc.), the target smart home device may include all smart home devices linked in the sleep mode. In some embodiments, controlling the target smart home device may include turning the target smart home device on or adjusting a parameter of the target smart home device.

The communication module 120 is a component configured for the user to establish a communication connection with another device (e.g., a cloud server or a smart home device). In some embodiments, the communication module 120 is configured to connect the controller 100 to another device (e.g., a control server) via a network. The network may include any suitable network for information and/or data exchange.

In some embodiments, the network may include a public network (e.g., the Internet), a private network (e.g., a local area network (LAN), a wide area network (WAN), etc.), or a combination thereof.

In some embodiments, the controller 100 may upload the control command to the control server based on the communication module 120. The control server is configured to format the control command uploaded by the communication module 120 to facilitate control of the target smart home device. For more details regarding the control server and the format processing, please refer to the subsequent description in the relevant section of the control system for the smart home.

In some embodiments, the controller 100 may also determine operational habit data based on an interaction of the user with the interaction module 110 and upload the operational habit data to the control server. The operational habit data represents an operation preference of the user for operating one or more indoor smart home devices within a certain time period. For example, the operational habit data may include an operation frequency, an operation type, a location of the user (the controller 100) in a room when performing an operation indoors, etc.

In some embodiments, the operational habit data may be obtained through statistical analysis by the controller 100 based on of an operation of the user, the location of the controller 100, and an operation status of the smart home, etc. For example, a form of the operational habit data determined by the controller 100 may include "the user habitually operates a curtain and a main light in the evening," "the user frequently adjusts volume of a speaker," "the user arrives home at 6:00 PM every day and first turns on a hallway light and a water dispenser," etc.

In some embodiments, the controller 100 may upload the operational habit data to the control server through the communication module 120.

In some embodiments, the controller 100 may display a preferred display configuration issued by the control server on the display module 130. The preferred display configuration includes one or more graphical elements displayed on the display module 130.

The preferred display configuration is used to indicate a graphical element that needs to be displayed on the display module 130 of the controller 100. In some embodiments, the control server determines the preferred display configuration based on the operational habit data of the user. The one or more graphical elements refer to an icon or a graphical symbol representing a particular smart home device. The user may use the one or more graphical elements to identify and select a corresponding smart home device for operation. For example, the one or more graphical elements may be a simple drawing or an outline of the corresponding smart home device.

The control server stores historical operational data of the user. At a corresponding moment, the control server may issue the preferred display configuration, i.e., issue the graphical element determined based on the historical operational data of the user, which correspond to one or more smart home devices that the user habitually (or is most likely to) operates at the corresponding moment.

After receiving the preferred display configuration, the controller 100 prioritizes display of the graphical element corresponding to the one or more smart home devices. For example, following the aforementioned operational habit of the user that "the user arrives home at 6:00 PM every day and first turns on the hallway light and the water dispenser", then at 6:00 PM, the display module 130 of the controller

100 prioritizes displaying icons for the hallway light and the water dispenser for quick selection and operation by the user among the plurality of smart home devices.

In some embodiments, the controller 100 may receive the preferred display configuration issued by the control server through the communication module 120.

Through the preferred display configuration, the user may intuitively access a commonly used smart home device through the one or more graphical elements, enabling quick and efficient operations.

In some embodiments, the preferred display configuration may be determined based on an operational behavior distribution. The operational behavior distribution refers to a probability distribution of the user performing a certain operation under a specific circumstance. In some embodiments, the operational behavior distribution may include a distribution condition (e.g., a specific time period, a custom room, etc.) and a probability of performing a certain operation (e.g., on/off, adjustment) under the distribution condition. For example, the operational behavior distribution may include probabilities of the user performing different operations on different smart home devices at different times and probabilities of the user performing different operations on different smart homes in different indoor locations (e.g., rooms).

In some embodiments, the operational behavior distribution may include a time distribution or a location distribution of historical operations of the user on the smart home devices. For example, if the user regularly enters a garden every three days to turn on a sprinkler to water a plant, there exists a statistical probability distribution between the behavior of turning on the sprinkler and factors of a time and a location of the behavior. In some embodiments, the operational behavior distribution may be determined by the control server based on a set or a plurality of sets of operational habit data uploaded by the controller 100 within a preset time period. For example, with respect to the previously mentioned operational habit data, "the user arrives home at 6:00 PM every day and first turns on the hallway light and the water dispenser", since the control server records the historical operational data that reflects an operational habit of the user, the control server may statistically determine the operational behavior distribution of the user at 6:00 PM every day, i.e., the operational behavior distribution indicates a relationship between the user and the smart home at 6:00 PM every day, at which time a probability for the user to control (turn on) the hallway light and the water dispenser is the highest.

In some embodiments, determining the preferred display configuration based on the operational behavior distribution may include using a historical operational behavior distribution of the user to estimate one or more smart home devices with the highest probability of user operation at a current time or a current location and determining the preferred display configuration accordingly. For example, every three days, the display module 130 of the controller 100 may display an icon for the sprinkler to facilitate the user in turning on the sprinkler or performing other actions.

In some embodiments, determining the operational behavior distribution based on the operational habit of the user allows for a better understanding and prediction of user behavior, enabling provision of a more personalized service.

A dwelling region (including indoor and outdoor regions) where the smart home is located may be divided into a plurality of preset sub-regions. For example, the plurality of preset sub-regions of the dwelling region may include a master bedroom, a guest room, a living room, a kitchen, a garden, etc.

In some embodiments, the operational behavior distribution may include a sub-behavior distribution in at least one preset sub-region, where the sub-behavior distribution represents a probability distribution of user performing a certain operation in a specific preset sub-region. It should be noted that the plurality of preset sub-regions mentioned above e.g., the master bedroom, the guest room, etc., are only examples. In some other embodiments, the plurality of preset sub-regions may be labeled as Sub-region 1, Sub-region 2, etc., and these names are for identification purposes only.

In some embodiments, the preferred display configuration may be determined based on a target sub-behavior distribution, which is determined from the sub-behavior distribution at the current location of the controller 100. The target sub-behavior distribution refers to a probability distribution of operation behaviors of the user within a specific preset sub-region based on time and/or location.

In some embodiments, the control server may select the target sub-behavior distribution from a plurality of sub-behavior distributions based on current location information and/or current time information of controller 100. For example, the control server may filter out the sub-behavior distribution corresponding to the current time or time period and/or the preset sub-region of the current location.

The manner of determining the preferred display configuration based on the target sub-behavior distribution is similar to the manner of determining the preferred display configuration based on the operational behavior distribution, as described above. For example, if the controller 100 is currently in the living room, the control server may determine the sub-behavior distribution of the living room from the operational behavior distribution as the target sub-behavior distribution, and determine the preferred display configuration and issue the preferred display configuration to the controller 100 (e.g., displaying icons for a TV and the main light in the living room on the display module 130) to facilitate the user in quickly selecting the target smart home device.

It should be noted that because the target sub-behavior distribution corresponds to a specific sub-region, the current preferred display configuration is only applicable to the specific sub-region. When in use, if the user moves the controller 100 to a new sub-region, the controller 100 may request the control server to reissue the preferred display configuration.

In some embodiments, a manner for determining the current location of the controller 100 may include, but is not limited to, user manual selection, ultra-wideband (UWB) positioning, etc.

By pre-dividing the at least one sub-region and determining the sub-behavior distribution corresponding to the at least one sub-region, it is possible to estimate the smart home device that the user is likely to control based on a region in which the controller 100 is located, simplifying user operations.

Since the division of the plurality of sub-regions within the dwelling region is typically fixed, signal strengths (e.g., signal strengths received from a wireless router) received by the controller 100 in the plurality of sub-regions are also generally consistent. Therefore, in some embodiments, the control server may determine the current location of the controller 100 based on the signal strength received by the controller 100. However, in certain scenarios where the router is placed at a central location indoors, two sub-regions with similar distances from the router might be prone to confusion in terms of location. Hence, in some embodiments, the control server may simultaneously obtain a displacement feature of the controller 100 and the signal strength and determine the current location of the controller 100 based on both the displacement feature and the signal strength within a preset time period.

Accordingly, the controller 100 also includes a displacement sensing module 140 and a signal strength detection module (not shown in the figure). The displacement sensing module 140 is configured to obtain the displacement feature of the controller 100 within the preset time period, while the signal strength detection module is configured to obtain a signal strength feature of the controller 100 within the preset time period.

In some embodiments, the displacement feature represents a movement of the controller 100 within the dwelling region during the preset time period and may include a direction, for example, moving 2 meters in a northeast direction at an angle of 40 degrees from the east. The signal strength feature represents a change in the signal strength at the current location of the controller 100 relative to a previous moment within the preset time period, which may be a difference in the signal strength before and after the displacement of the controller 100, for example, −12 dBm.

In some embodiments, the current location of the controller 100 may be determined based on a sequence of displacement features and corresponding signal strength features for one or more moments, using a region mapping table constructed by the control server based on historical data uploaded by the controller 100. The historical data may be obtained by guiding the user to walk indoors with the controller 100 after its initialization, input by the user to an application, or collected based on daily operations of the user.

The region mapping table may include the sequence of the displacement features and the corresponding signal strength features, along with the corresponding sub-region of the current location of the controller 100. The control server may quickly determine the current location of the controller 100 by looking up the table.

In some embodiments, the region mapping table may be in the form of Table 1.

TABLE 1

| Sequence of the displacement features and the corresponding signal strength features | Corresponding sub-region of the current location of the controller |
|---|---|
| [(Displacement Feature $X_{11}$, Signal Strength Feature $Y_{11}$), (Displacement Feature $X_{12}$, Signal Strength Feature $Y_{12}$), . . . ] | Master Bedroom |
| [(Displacement Feature $X_{21}$, Signal Strength Feature $Y_{21}$), (Displacement Feature $X_{22}$, Signal Strength Feature $Y_{22}$), . . . ] | Living Room |
| [Displacement Feature $X_{31}$, Signal Strength Feature $Y_{31}$, (Displacement Feature $X_{32}$, Signal Strength Feature $Y_{32}$), . . . ] | Bathroom |
| . . . | . . . |

By establishing the region mapping table of the corresponding dwelling region, and after obtaining the sequence of the displacement features and the corresponding signal strength features for the one or more moments, the current location can be quickly determined, reducing computational load on the control server.

Referring to FIG. 2, a schematic diagram of the structure of the controller 100 is shown. In some embodiments, the interaction module 110 is set as a rotary ring 210, which has a circular contour and may be rotatably mounted on a base 220 of the controller 100.

In some embodiments, the rotary ring 210 may perform a function of the sliding unit 114. This means that the user may achieve the function, e.g., switching, increasing, or decreasing by rotating the rotary ring 210. For example, rotating the rotary ring 210 clockwise may be defined as an increase. When the target smart home device is the air conditioner, rotating the rotary ring clockwise may increase the temperature. Alternatively, if the target smart home device is the speaker, rotating the ring clockwise may increase the volume, etc.

In some embodiments, the rotary ring 210 may also perform a function of the button unit 112. When the user clicks the rotary ring 210 at different positions along an axis of the rotary ring 210, it may correspond to the function e.g., selection or return. In some embodiments, to facilitate rotation of the rotary ring 210, a pattern or a coating may be provided on the rotary ring 210 to increase friction. In some embodiments, the interaction module 110 may also be set as a roller or a slider, or other mechanisms.

Through the rotary ring 210, the user can quickly and easily interact with the controller 100, which is simple operation and has a low learning cost.

In some embodiments, the functions of the sliding unit 114 and the button unit 112 may be implemented by different mechanisms. For example, the sliding unit 114 may be a slider, while the button unit 112 may be a button, etc.

In some embodiments, the controller 100 may determine the target smart home device based on operational data of the user and determine an adjustment range and an adjustment sensitivity of the sliding unit 114 based on the target smart home device.

In some embodiments, the operational data of the user may include an operation behavior (e.g., sliding, clicking, etc.) performed on the interaction module 110. In some embodiments, the user may perform switching or selecting by sliding or clicking the rotary ring 210. At the same time, the user's operation may be reflected on the display module 130, meaning that the user may use the rotary ring 210 and the display module 130 to determine the target smart home device. For example, the user may select a specific smart home device as the target smart home device by clicking on a preset region (e.g., an operational region near the one or more graphical elements displayed on the display module 130) on the rotary ring 210 and adjust a parameter value of the target smart home device by rotating the rotary ring 210.

The parameter value of the target smart home device refers to one or more parameters that are adjustable and related to operation of the target smart home device.

The adjustment range of the rotary ring 210 refers to a working parameter range of the target smart home device. For example, a temperature adjustment range for the air conditioner is typically between 16° C. and 30° C., while an adjustment range for a light is typically between 75 lux and 2000 lux. The adjustment sensitivity refers to an effect of a basic adjustment operation (e.g., rotating the rotary ring 210 by 10 degrees or sliding the sliding unit 114 by 1 cm) of the interaction module 110 on a numerical value of an adjustment on the target smart home device. Different smart home devices have different adjustment ranges. For example, in the case of the air conditioner and the light, using the same adjustment sensitivity may result in some smart home devices being too sensitive to adjustment, while some other smart home devices may be adjusted too slowly. Therefore, it is necessary to determine different adjustment ranges and adjustment sensitivities for the interaction module 110 based on different target smart home devices.

In some embodiments, the controller 100 may determine the adjustment range of the interaction module 110 and the adjustment sensitivity based on a factory parameter of each smart home device and determine the adjustment sensitivity based on a type and an adjustment range of the interaction module 110. Continuing with the previous example, if the interaction module 110 is the rotary ring 210, the adjustment sensitivity of the air conditioner may be set as follows: for every 10° rotation of the rotary ring 210, the temperature increases or decreases by 0.5° C. The adjustment sensitivity of the light may be set as follows: for every 10° rotation of the rotary ring 210, the brightness increases or decreases by 50 lux.

By controlling the adjustment range and the adjustment sensitivity of the interaction module 110, the user can quickly adjust different types of smart home devices with different adjustment ranges.

In some embodiments, the controller 100 may determine the adjustment range and the adjustment sensitivity of the rotary ring 210 based on a current parameter value and a parameter value distribution of the target smart home device. The current parameter value represents a current working parameter of the target smart home device or a working parameter of the target smart home device before the last shutdown. The current parameter value may be obtained from the control server. The parameter value distribution referrers to a probability distribution of the rotary ring 210 being adjusted to a particular parameter value under a certain condition. The parameter value distribution may characterize time duration that the target smart home device operates at various parameter values.

In some embodiments, the controller 100 may determine the current adjustment range of the rotary ring 210 based on the current parameter value and the parameter value distribution of an object to be adjusted. For example, if it is determined, based on the operational habit data of the user, that the user prefers to set the air conditioner temperature between 25° C. and 28° C. during the winter, as the time duration of the air conditioner parameter value (e.g., temperature) remained between 25° C. and 28° C. is longer, then the probability of the parameter value distribution between 25° C. and 28° C. is higher. In some embodiments, determining the adjustment range of the rotation ring 210 may include that, as in the example mentioned above, if the parameter value distribution indicates that the user prefers to set the air conditioner temperature between 25° C. and 28° C., then when selecting the air conditioner as the target smart home device, the adjustment range of the rotation ring 210 is set between 25° C. and 28° C.

In some embodiments, the adjustment sensitivity of the rotary ring 210 may be adjusted based on the determined adjustment range of the rotary ring 210. Under a normal circumstance, when the rotation ring 210 is rotated by 10 degrees, a set temperature of the air conditioner increases or decreases by 0.5° C. When the adjustment range of the rotation ring 210 is set to be between 25° C. and 28° C., the corresponding adjustment sensitivity of the rotation ring 210 may be small, for example, when the rotation ring 210 is rotated by 10 degrees, the temperature increases or decreases by 0.1° C.

In some embodiments, the controller 100 may determine the current adjustment sensitivity of the rotary ring 210 based on the current parameter value and the parameter value distribution of the object to be adjusted.

In some embodiments, the determination of the adjustment sensitivity of the rotary ring 210 may include that: within the determined parameter value distribution, if a degree of non-uniformity of the time duration for various parameter values is less than a preset value, the smaller the degree of non-uniformity, the more likely it is that each parameter value is a preferred target value for the user. Therefore, the control server may control a smaller adjustment sensitivity of the rotation ring 210. The degree of non-uniformity of the time duration for the various parameter values is a variance of the time duration for the various parameter values. For example, in the case of the aforementioned light, the adjustment sensitivity may be lower than 50 lux, specifically, 30 lux or 20 lux, etc.

If the degree of non-uniformity of the time duration for the various parameter values is greater than the preset value, the control server may determine a parameter value with the highest distribution probability (i.e., the longest time duration) from the parameter value distribution. Then, taking a difference between the parameter value and the current parameter value of the object to be adjusted, the control server calculates the absolute value of the difference. The larger the absolute value, the greater the tendency towards larger fluctuation during adjustment. Therefore, the control server may control the adjustment sensitivity of the rotary ring 210 to be higher. Continuing with the previous example of the light, in this scenario, the adjustment sensitivity may be set to be higher than 50 lux, specifically, 30 lux or 20 lux, etc.

In some embodiments, as mentioned above, the degree of non-uniformity of the time duration for the various parameter values may be the variance of the time duration for the various parameter values. The preset value may be determined by calculating the variance of the time duration for all parameter values. Different smart home devices and the user may have different parameter value distribution situations, so there are no restrictions on the preset value in the present disclosure.

It should be noted that in some embodiments, the above adjustment range may not meet a current need of the user. In response to the user adjusting the rotary ring 210 to a boundary of an initially preset adjustment range (e.g., if the initially preset adjustment range is between 25° C. and 28° C., then the boundary is 25° C. and 28° C.), the user may want to adjust to a parameter value outside of an estimated value. In this case, the adjustment range of the rotary ring 210 may be redefined. For example, the initially preset adjustment range may be expanded to be between 24° C. and 29° C., or automatically configured to cover an entire parameter range (i.e., 16° C. to 30° C.) for user adjustment.

In some embodiments, the redefined preset adjustment range may be determined based on a comparison between the time duration for a parameter value range outside the initially preset adjustment range and a preset time duration. When the time duration for the parameter value range outside the initially preset adjustment range is greater than the preset time duration, the parameter value may be added to the initially preset adjustment range to obtain the redefined preset adjustment range. For example, assuming the initially preset adjustment range is between 25° C. and 28° C., if the time duration of the parameter value range between 22° C. and 25° C. is greater than the preset time duration, the redefined preset adjustment range may be between 22° C. and 28° C. In some embodiments, the preset time duration may be set as needed, such as 10% of a total working time of the target smart home device.

In some embodiments, determining the adjustment range and the adjustment sensitivity based on user habit (the parameter value distribution) may help predict a user preference, increase intelligence of the controller 100, and enhance user experience.

In some embodiments, when the controller 100 is in a location with weak signal strength, an adjustment may be affected due to a network delay or packet loss. For example, the user may perform five operations in a short period of time, but only four of the five operations are uploaded to the control server. Therefore, the controller 100 may determine the adjustment sensitivity of the interaction unit based on the current parameter value of the target smart home device, the parameter value distribution, and a signal strength feature of the current location of the controller 100. The signal strength feature may be obtained based on the signal strength detection module mentioned earlier. Further details about the signal strength may be found in the earlier sections.

In some embodiments, as the signal strength decreases, the adjustment sensitivity of the rotary ring 210 may be controlled to be appropriately reduced. For example, for each halving of the signal strength, the adjustment sensitivity may decrease by 50%.

By reducing the adjustment sensitivity when the signal strength is lower, a significant parameter fluctuation due to the network delay or packet loss is avoided in a process of a plurality of adjustments, thereby improving the user experience.

If the controller 100 has a high adjustment sensitivity, it may cause a sudden and significant change (e.g., an instant increase) in power of the controlled smart home device during user adjustment. This may lead to the smart home device exceeding its maximum power limit or an indoor circuit exceeding its maximum load, resulting in an abnormality. Therefore, in some embodiments, the controller 100 may determine the adjustment sensitivity of the interaction unit based on the current parameter value of the target smart home device, the parameter value distribution, the signal strength feature of the current location of the controller 100, and a risk of a circuit/device abnormality in a future time period. The impact of the current parameter value, the parameter value distribution, and the current location signal strength feature on adjustment sensitivity may be seen in the earlier descriptions. The risk of the circuit/device abnormality in the future time period is positively correlated with total power of all indoor smart home devices and/or power of the currently controlled smart home device.

In some embodiments, the risk of the circuit/device abnormality in the future time period may be determined based on a machine learning model. Further details about determining the risk of the circuit/device abnormality in the future time period based on the machine learning model may be found in later sections.

In some embodiments, as the risk of the circuit/device abnormality in the future time period increases, the adjustment sensitivity of the rotary ring 210 may be appropriately reduced. For example, for each 10% increase in the total power of all indoor smart home devices, the adjustment sensitivity decreases by 30%, and for each 10% increase in the power of the currently controlled smart home device, the adjustment sensitivity decreases by 50%.

By reducing the adjustment sensitivity when the total power of all indoor smart home devices or the power of the currently controlled smart home device is high, it prevents a significant fluctuation in power from causing the abnormality in one or more devices.

In some embodiments, the controller 100 also includes the display module 130. The controller 100 display status information and/or a monitoring parameter of one or more smart home devices through the display module 130. As shown in FIG. 2, in some embodiments, the display module 130 may be an LCD screen or an E-ink display (EPD).

In some embodiments, the display module 130 may be located in an inner ring position of the rotary ring 210. The status information of the one or more smart home devices may include the current parameter value of the one or more smart home devices. Taking the air conditioner as an example, the status information may include a current set temperature, a fan speed, a mode, etc. The monitoring parameter of the one or more smart home devices may be environmental information obtained from a smart home device with a monitoring capability, e.g., a smart thermometer, an infrared detector, etc. For example, in the case of the air conditioner, the monitoring parameter may be a current indoor temperature.

In some embodiments, the display module 130 may also display other parameters, for example, remaining battery power of the controller 100, a current signal strength, a calendar, etc.

In some embodiments, the display module 130 may also display warning information. The warning information is determined and issued by the cloud server. The warning information may represent an operational risk of one or more smart home devices in a future time period. In some embodiments, the operational risk may be positively correlated with the operating power of the one or more smart home devices.

In some embodiments, the controller 100 may determine the risk of the circuit/device abnormality in the future time period through an abnormality prediction model, and determine the warning information based on the risk of the circuit/device abnormality in the future time period. For example, the controller 100 may generate the warning information based on the risk of the circuit/device abnormality in the future time period and a device type of a current smart home device.

The abnormality prediction model may be a machine learning model. An input to the abnormality prediction model is device types of a plurality of smart home devices and corresponding power sequences. In some embodiments, assuming that a count of the plurality of smart home devices is n, the input to the abnormality prediction model may be represented as "Device type of Smart Home Device 1+power sequence in a preset time period, Device type of Smart Home Device 2+power sequence in the preset time period, . . . , and Device type of Smart Home Device n+power sequence in the preset time period." The preset time period may be half-hour or one hour before a current time. An output of the abnormality prediction model is the risk of the circuit/device abnormality in the future time period.

The abnormality prediction model may be obtained by training an initial abnormality prediction model. Historical data, e.g., actual historical power sequences for smart home devices in a particular historical time period, may be used as training samples, and whether a circuit abnormality or a device abnormality occurs in a future time period corresponding to the historical time period is used as labels. For example, the training samples may include actual historical power sequences for smart home devices in a first historical time period and a second historical time period, where the first historical time period precedes the second historical time period. To illustrate with the first historical time period, if the circuit abnormality or the device abnormality occurs, the label corresponding to the actual historical power sequences of the smart home devices in the first historical time period is set to 1. Conversely, if no circuit abnormality or device abnormality occurs, the label is set to 0. The historical data may be collected by the controller 100 during daily operations.

In some embodiments, the abnormality prediction model may be trained using labeled training samples as described above. Specifically, the labeled training samples are input into the initial abnormality prediction model, and a loss function is constructed based on the labels and a result of the initial abnormality prediction model. A parameter of the abnormality prediction model is iteratively updated based on the loss function using gradient descent or other techniques. The model training is considered to be complete when a preset condition is met. The preset condition may be that the loss function converges or a count of iterations reaches a threshold.

In some embodiments, the input to the abnormality prediction model also includes the parameter value distribution of each smart home device. For more information on the parameter value distribution of the smart home, please refer to the relevant description in the previous text, which will not be reiterated here.

The input to the abnormality prediction model, including the parameter value distribution of the one or more smart home devices, may reflect a parameter setting habit of the user, thus to some extent, aiding in the prediction of future power consumption of the smart home.

By displaying the status information and the monitoring parameter of the one or more smart home devices through the display module 130, the user can have an intuitive understanding of a situation in other smart home devices, enhancing the user experience.

In some embodiments, the status information displayed on the display module 130 may not be fixed. Specifically, the status information to be displayed may be determined through one or more of the following ways.

In some embodiments, displayed information may be user-customized. Specifically, the user may select one or more content items from a plurality of preset display contents, including but not limited to a calendar, a battery level, a room temperature, etc.

In some embodiments, the displayed information may be switched or updated based on statuses of each smart home device. For example, when a particular smart home device is powered on or activated, the display module 130 shows information related to that smart home device. When a smart home device is turned off or in standby mode, the display module may switch to other smart home devices, e.g., a most recently operated or commonly used smart home device.

In some embodiments, a future operation of the user may be predicted based on current statuses of each smart home device, and the displayed information may be determined based on the future operation of the user. The future operation of the user may be determined based on the operational habit of the user or the operational behavior distribution. More contents on the operational habit of the user and the operational behavior distribution may be found in previous descriptions.

Continuing with the previous example, if the user typically operates the curtain and the main light in the evening, the display module may show the current status and/or a quick setting for the curtain and the main light between 7:00 PM and 9:00 PM. For example, if the user carries the controller 100 outside and a gas leak occurs indoors, data regarding the gas leak detected by a gas leak monitoring device may be pushed to the controller 100, and the display module 130 automatically shows gas concentration data.

Displaying different information through the display module 130 allows the user to quickly understand the status of other smart home devices when using the controller 100.

In some embodiments, the display module 130 may include a touchscreen display unit 230. The user may interact quickly and intuitively using the touchscreen display unit 230. In some embodiments, the touchscreen display unit 230 may also realize all or some of functions of the button unit 112.

In some embodiments, the controller 100 also includes the sensing module 140. The sensing module 140 includes a plurality of sensing units, e.g., a photosensitive unit 240 (or a photosensitive unit 142 in FIG. 1) and/or a near-field capacitive sensing unit (not shown in the figure). Referring to FIG. 2, the photosensitive unit 240 may be located on the base 220 of the controller 100, close to an upper (a direction where the display module 130 is located) position. The photosensitive unit 240 allows the controller 100 to perceive an ambient light intensity and adjust a brightness of the display module 130 accordingly. This ensures that the display module 130 maintains a moderate brightness for comfortable viewing while preventing power wastage from excessive brightness. The near-field capacitive sensing unit is configured to monitor the user or a hand of the user approaching the controller 100 and generate a signal. Specifically, when the near-field capacitive sensing unit detects the signal, the near-field capacitive sensing unit activates the display module 130. When no signal is detected, the near-field capacitive sensing unit may temporarily turn off the display module 130 to save power. In some embodiments, the near-field capacitive sensing unit may be configured to detect a capacitive fluctuation through a sensing antenna when the user or a hand of the user is within 5 cm (or 10 cm) of the sensing antenna, so as to complete recognition of the approaching of the user or the hand of the user and generate the signal.

In some embodiments, the sensing module 140 may also include other sensing units, e.g., a temperature sensor, a humidity sensor, a magnetic field sensor, etc.

In some embodiments, the display module 130 may display a recommended setting value for the monitoring parameter of one or more sensing units within the sensing module 140, and provide an input interface on an interface of the display module 130 for configuring the one or more sensing units.

The recommended setting value refers to a specific value that is suggested for the user to set each monitoring parameter to. The user may choose whether to set actual setting values of each monitoring parameter to corresponding recommended setting values based on an actual need. The input interface may be used to adjust the actual setting values of the monitoring parameters. In some embodiments, the recommended setting value may be a monitoring range of the one or more sensing units, and when a sensing parameter of the one or more sensing units exceeds a range of the recommended setting value, an alarm or a notification may be triggered.

In some embodiments, the recommended setting value is determined and issued to the controller by the smart home cloud server. The smart home cloud server may determine the recommended setting value for the one or more sensing units using a preset rule table based on operational statuses of the indoor smart home devices.

The preset rule table may be constructed based on a statistical result of extensive historical data for a current user or other users. For example, based on historical data statistics, most fires may occur when bathing and heating water perform simultaneously. Hence, the operational statuses of smart home devices may be obtained. When a situation arises where both bathing and heating water activities occur (e.g., simultaneous operations of a gas water heater and a stove), it is necessary to recommend an increase in a monitoring frequency of a smoke sensor to the user, where the monitoring frequency of the smoke sensor is the recommended setting value.

As an example, the preset rule table may be in the form of Table 2.

TABLE 2

| Operational Status of Smart Home Devices | Recommended setting value for one or more sensing units |
|---|---|
| ("Smart Water Heater", "Running"), ("Smart Air Conditioner", "Not Running"), . . . | (Smoke Sensor, Recommended Monitoring Frequency a1), (Temperature and Humidity Sensor, Recommended Monitoring Frequency a2), . . . |
| . . . | . . . |

By constructing the above preset rule table, the recommended setting value for the one or more sensing units under different scenarios may be obtained from the statistical result based on the historical data. This facilitates user adjustment for better monitoring of an indoor condition and ensuring safety.

It should be understood that the controller 100 and the modules thereof, as shown in FIG. 1, may be implemented in various ways.

It is worth noting that the descriptions of the controller 100 and the modules thereof are provided for convenience and should not limit the scope of the present disclosure. It is understood that those skilled in the art, once they understand the principles of this system, may make arbitrary combinations of the various modules or form subsystems connected to other modules without departing from the principles. In some embodiments, the modules or units disclosed in FIG. 1 may either be different modules or units or be a single module or unit that implements the functions of two or more of the mentioned modules or units. For example, the modules or units may share a common storage unit, or each module may have its own separate storage unit, and so forth. Variations like these are within the scope of the present disclosure.

Figure 3:
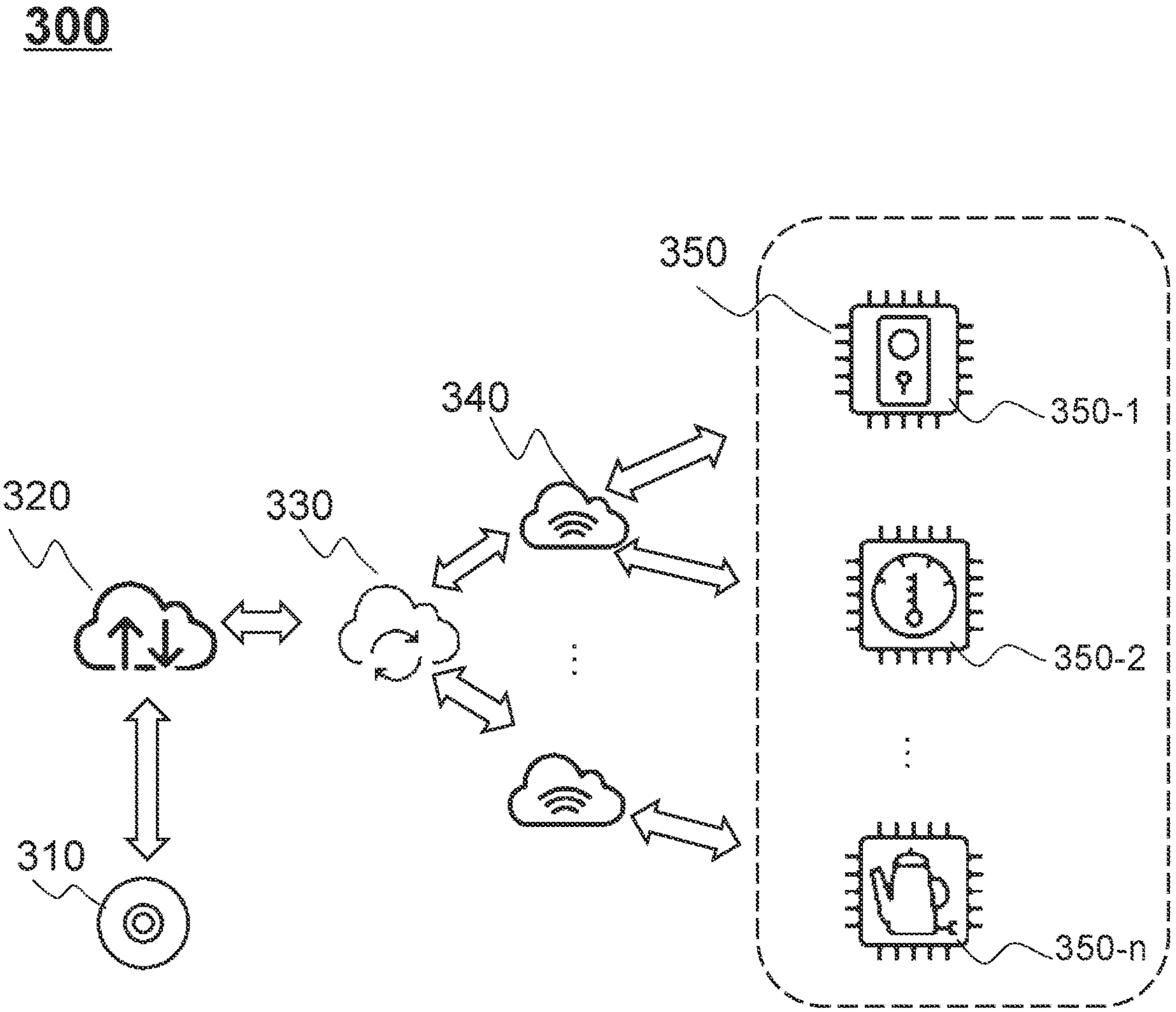
FIG. 3 is a schematic diagram of an exemplary scenario of a control system 300 for a smart home according to some embodiments of the present disclosure.

FIG. 3 is a schematic diagram of an exemplary scenario of a control system 300 for a smart home according to some embodiments of the present disclosure. As shown in FIG. 3, the control system 300 may include a controller 310, a control server 320, a collaborative server 330, a smart home cloud server 340, and a plurality of smart home devices 350 (e.g., smart home device 350-1, smart home device 350-2, . . . , smart home device **350-*n*) connected sequentially. The collaborative server 330 may communicate with one or more smart home cloud servers 340, and the smart home cloud server 340 may communicate with one or more smart home devices 350**.

In some embodiments, the controller 310 is configured to obtain a control command and upload the control command to the control server 320. For more information about the controller 310, please refer to the relevant description in FIGS. 1 and 2, which is not repeated here.

In some embodiments, because the control command generated by user operation on the controller 310 may not be directly read by the collaborative server 330, the control server 320 is configured to format the control command to obtain command data, which is then transmitted to the collaborative server 330.

In some embodiments, formatting means converting the control command into data, i.e., the command data, that is readable to the collaborative server 330, based on specific algorithms or rules.

In some embodiments, the control server 320 may also determine an operational behavior distribution based on operational habit data uploaded by the controller 310 within a preset period, and determine and issue a preferred display configuration to the controller 310 based on the operational behavior distribution. The preferred display configuration includes one or more graphical elements to be displayed.

For more information on the operational behavior distribution and the preferred display configuration, please refer to the relevant description in FIG. 1, which is not repeated here.

The collaborative server 330 is configured to distribute the command data to accurately control a target smart home device 350 among the plurality of smart home devices 350. Distributing the command data by the collaborative server 330 includes forwarding the command data (the control command) to the smart home cloud server 340 corresponding to the plurality of smart home devices 350. It should be noted that in some embodiments, if the command data may be directly read by the plurality of smart home devices 350, the collaborative server 330 may directly send the command data to the plurality of smart home devices 350.

In some embodiments, the collaborative server 330 is an Amazon Alexa cloud server. In some other embodiments, the collaborative server 330 may also be a Xiaomi Smart Home cloud server, a Tmall Genie cloud server, a Sonos speaker cloud server, a LIFX lighting cloud server, etc.

In some embodiments, the smart home cloud server 340 is configured to control the plurality of smart home devices 350 to perform a responsive operation based on the command data. The responsive operation performed by the plurality of smart home devices 350 may reflect an intention of the user operating on the controller 310, e.g., turning a light on or off, adjusting the temperature of the air conditioner, etc.

In some embodiments, the plurality of smart home devices 350 are configured to feedback a control result to the smart home cloud server 340 based on an execution result of the responsive operation. For example, the control result may include but is not limited to success, failure, pending retry, etc.

Through the control system 300 for the smart home, the user can conveniently control all smart home devices 350 throughout a house by simply using the controller 310 and easily access the status information of each smart home device 350.

Figure 4:
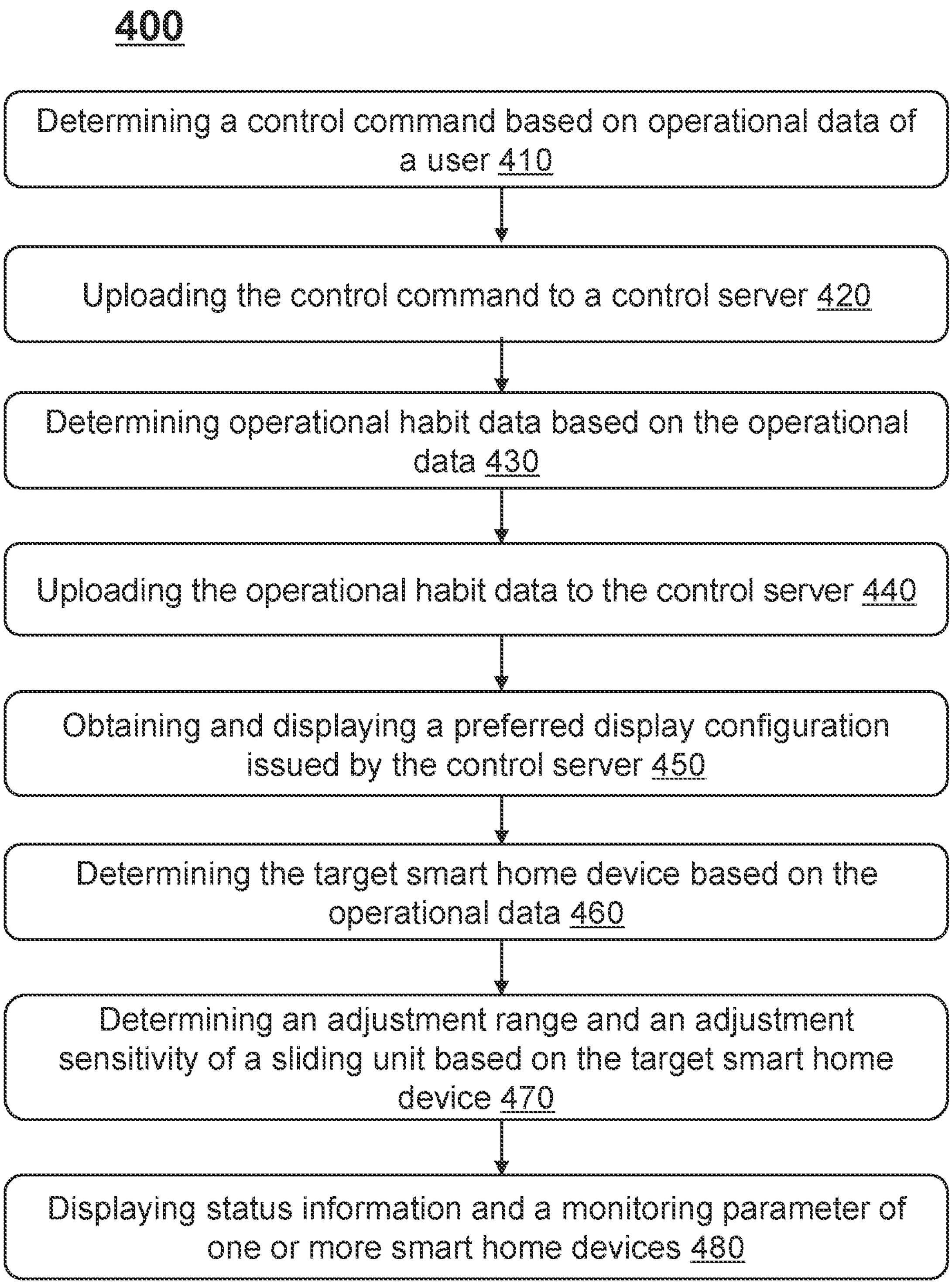
FIG. 4 is a schematic diagram of an exemplary flowchart of a control method for a smart home according to some embodiments of the present disclosure.

FIG. 4 is a schematic diagram of an exemplary flowchart of a control method for a smart home according to some embodiments of the present disclosure. As shown in FIG. 4, in some embodiments, a process 400 may be executed by a controller (e.g., the controller 100 or the controller 310), and the process 400 includes the following steps.

In step 410, determining a control command based on operational data of a user, wherein the operational data includes at least one of sliding data and click data, and the control command is configured to control a target smart home device.

For more information about the operational data, the control command, and the target smart home device, please refer to the relevant content in FIG. 1, which is not repeated here.

In step 420, uploading the control command to a control server.

For more information about the control server, please refer to the relevant content in FIG. 3, which is not repeated here.

In some embodiments, the process 400 also includes the following steps.

In step 430, determining operational habit data based on the operational data.

In step 440, uploading the operational habit data to the control server.

For more information about the operational habit data, please refer to the relevant content in FIG. 1, which is not repeated here.

In step 450, obtaining and displaying a preferred display configuration issued by the control server, wherein the preferred display configuration includes one or more graphical elements displayed on the display module, and the preferred display configuration is determined based on the operational habit data.

For more information about the preferred display configuration, please refer to the relevant content in FIG. 1, which is not repeated here.

In step 460, determining the target smart home device based on the operational data.

In step 470, determining an adjustment range and an adjustment sensitivity of a sliding unit based on the target smart home device.

For more information about the adjustment range and the adjustment sensitivity, please refer to the relevant content in FIG. 1, which is not repeated here.

In step 480, displaying status information and a monitoring parameter of one or more smart home devices.

For more information about the status information and the monitoring parameter, please refer to the relevant content in FIG. 1, which is not repeated here.

By executing the control method for the smart home, the controller can conveniently control all smart home devices throughout the house and easily access the status information of each smart home device, facilitating user operations.

Figure 5:
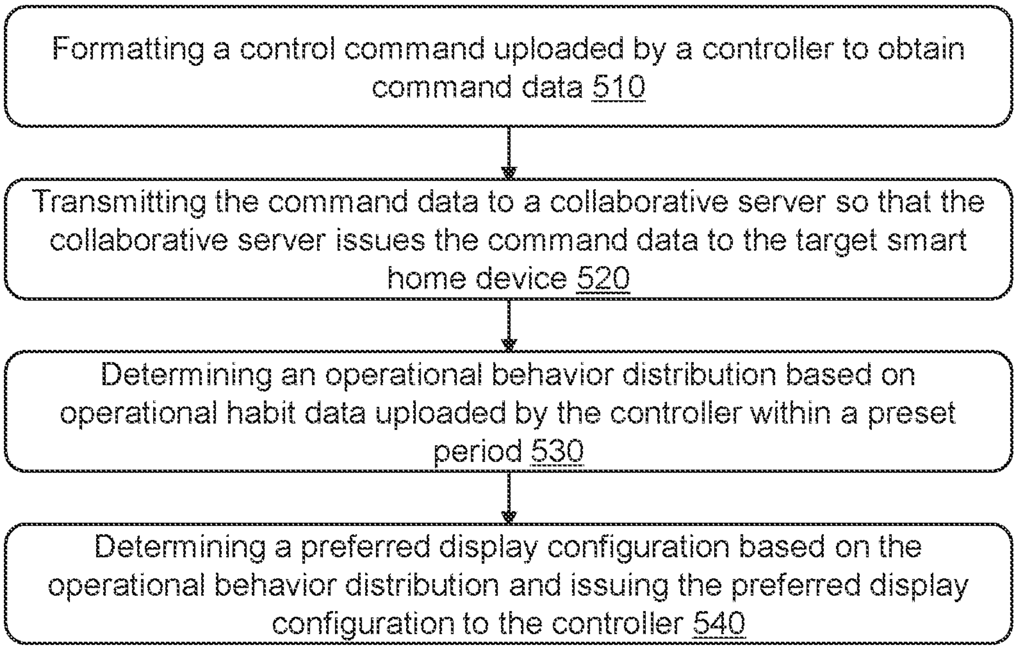
FIG. 5 is a schematic diagram of an exemplary flowchart of a control method for a smart home according to some embodiments of the present disclosure.

FIG. 5 is a schematic diagram of an exemplary flowchart of a control method for a smart home according to some embodiments of the present disclosure. As shown in FIG. 5, in some embodiments, a process 500 may be executed by a control server (e.g., the control server 320), and the process 500 includes the following steps.

In step 510, formatting a control command uploaded by a controller to obtain command data, wherein the command data is configured to control a target smart home device, and the control command is determined based on operational data of a user.

For more information about the formatting, please refer to the relevant content in FIG. 3, which is not repeated here.

In step 520, transmitting the command data to a collaborative server so that the collaborative server issues the command data to the target smart home device.

For more information about the collaborative server, please refer to the relevant content in FIG. 3, which is not repeated here.

In some embodiments, the collaborative server may be an Amazon Alexa cloud server.

In some embodiments, the process 500 also includes the following steps.

In step 530, determining an operational behavior distribution based on operational habit data uploaded by the controller within a preset period.

For more information about the operational habit data and the operational behavior distribution, please refer to the relevant content in FIG. 1, which is not repeated here.

In step 540, determining a preferred display configuration based on the operational behavior distribution and issuing the preferred display configuration to the controller. The preferred display configuration includes one or more graphical elements to be displayed.

For more information about the preferred display configuration, please refer to the relevant content in FIG. 1, which is not repeated here.

It should be noted that the descriptions of the processes 400 and 500 above are provided for illustration and explanation purposes only and do not limit the scope of the present disclosure. Those skilled in the art may make various modifications and changes to the processes 400 and 500 under the guidance of the present disclosure. However, these modifications and changes are still within the scope of the present disclosure.

The basic concepts have been described above, and it is apparent to those skilled in the art that the foregoing detailed disclosure is intended as an example only and does not constitute a limitation of the present disclosure. Although not expressly stated herein, those skilled in the art may make various modifications, improvements, and amendments to the present disclosure. Such modifications, improvements, and amendments are suggested in the present disclosure, so such modifications, improvements, and amendments remain within the spirit and scope of the exemplary embodiments of the present disclosure.

At the same time, specific terms are employed to describe the embodiments of the present disclosure. Terms e.g., "an embodiment," "one embodiment," and/or "some embodiments" are intended to refer to one or more features, structures, or features associated with at least one embodiment of the present disclosure. Thus, it should be emphasized and noted that the terms "an embodiment," "one embodiment," or "an alternative embodiment," mentioned at different locations in the present disclosure two or more times, do not necessarily refer to a same embodiment. Additionally, certain features, structures, or features of one or more embodiments of the present disclosure may be appropriately combined.

Additionally, unless explicitly stated in the claims, the order of processing elements and sequences, the use of numerical or alphabetical characters, or the use of other names in the present disclosure are not intended to limit the order of the processes and methods. While various examples have been discussed in the disclosure as presently considered useful embodiments of the invention, it should be understood that such details are provided for illustrative purposes only. The appended claims are not limited to the disclosed embodiments, but instead, the claims are intended to cover all modifications and equivalent combinations that fall within the scope and spirit of the present disclosure. For example, although system components described above may be implemented through hardware devices, they may also be implemented solely through software solutions, e.g., installing the described system on existing processing equipment or mobile devices.

Similarly, it should be noted that, for the sake of simplifying the disclosure of the embodiments of the present disclosure to aid in understanding of one or more embodiments, various features are sometimes grouped together in one embodiment, drawing, or description. However, this manner of disclosure is not to be interpreted as requiring more features than are expressly recited in the claims. In fact, the features of various embodiments may be less than all of the features of a single disclosed embodiment.

Some embodiments use numbers to describe the number of components, and attributes, and it should be understood that such numbers used in the description of the embodiments are modified in some examples by the modifiers "about", "approximately", or "generally". Unless otherwise stated, "about", "approximately" or "generally" indicates that a variation of ±20% is permitted. Accordingly, in some embodiments, the numerical parameters used in the present disclosure and claims are approximations, which may change depending on the desired features of the individual embodiment. In some embodiments, the numeric parameters should be considered with the specified significant figures and be rounded to a general number of decimal places. Although the numerical domains and parameters configured to confirm the breadth of their ranges in some embodiments of the present disclosure are approximations, in specific embodiments such values are set as precisely as possible within the feasible range.

With respect to each patent, patent application, patent application disclosure, and other material, e.g., articles, books, manuals, publications, documents, etc., cited in the present disclosure, the entire contents thereof are hereby incorporated herein by reference. Application history documents that are inconsistent with or conflict with the contents of the present disclosure are excluded, as are documents (currently or hereafter appended to the present disclosure) that limit the broadest scope of the claims of the present disclosure. It should be noted that in the event of any inconsistency or conflict between the descriptions, definitions, and/or use of terminology in the materials appended to the present disclosure and those described in the present disclosure, the descriptions, definitions, and/or use of terminology in the present disclosure shall prevail.

In closing, it should be understood that the embodiments described in the present disclosure are intended only to illustrate the principles of the embodiments of the present disclosure. Other deformations may also fall within the scope of the present disclosure. Thus, by way of example and not limitation, alternative configurations of embodiments of the present disclosure may be considered consistent with the teachings of the present disclosure. Accordingly, the embodiments of the present disclosure are not limited to the embodiments expressly presented and described herein.

What is claimed is:

1. A controller for a smart home, comprising an interaction module and a communication module, wherein the interaction module includes at least one of a button unit and a sliding unit, and the controller is configured to:

obtain a control command based on the interaction module; and upload the control command to a control server via the communication module, wherein the control command is configured to control a target smart home device;

wherein the controller is further configured to:

determine the target smart home device from a plurality of smart home devices based on operational data of a user; and determine an adjustment range and an adjustment sensitivity of the sliding unit based on a current parameter value and a parameter value distribution of the target smart home device, wherein to determine the adjustment sensitivity, the controller is further configured to:

determine the adjustment sensitivity of the sliding unit based on the current parameter value of the target smart home device, the parameter value distribution of the target smart home device, a signal strength feature of a current location of the controller, and a risk of a circuit or device abnormality in a future time period, wherein the risk of the circuit or device abnormality in the future time period is determined through an abnormality prediction model, and the abnormality prediction model is a machine learning model.

2. The controller for the smart home of claim 1, wherein the controller is further configured to:

determine operational habit data based on user operation on the interaction module; and upload the operational habit data to the control server.

3. The controller for the smart home of claim 2, further comprising a display module, and the controller is further configured to:

display a preferred display configuration issued by the control server on the display module, wherein the preferred display configuration includes one or more graphical elements displayed on the display module, and the one or more graphical elements correspond to one or more smart home devices.

4. The controller for the smart home of claim 1, wherein the sliding unit is configured as a rotary ring.

5. The controller for the smart home of claim 1, further comprising a display module, and the controller is further configured to:

display status information and/or a monitoring parameter of one or more smart home devices through the display module.

6. The controller for the smart home of claim 5, wherein the display module includes a touchscreen display unit.

7. The controller for the smart home of claim 1, further comprising a sensor module, wherein the sensor module includes a photosensitive unit and/or a near-field capacitive sensing unit.

8. A control method for a smart home, performed by a controller comprising an interaction module and a communication module, wherein the interaction module includes at least one of a button unit and a sliding unit, and the control method comprises:

obtaining a control command based on the interaction module, wherein the control command is configured to control a target smart home device; and uploading the control command to a control server via the communication module;

wherein the control method further comprises:

determining the target smart home device from a plurality of smart home devices based on operational data of a user; and determining an adjustment range and an adjustment sensitivity of the sliding unit based on a current parameter value and a parameter value distribution of the target smart home device, wherein the determining the adjustment sensitivity includes:

determining the adjustment sensitivity of the sliding unit based on the current parameter value of the target smart home device, the parameter value distribution of the target smart home device, a signal strength feature of a current location of the controller, and a risk of a circuit or device abnormality in a future time period, wherein the risk of the circuit or device abnormality in the future time period is determined through an abnormality prediction model, and the abnormality prediction model is a machine learning model.

9. The control method for the smart home of claim 8, further comprising:

determining operational habit data based on the operational data; and uploading the operational habit data to the control server.

10. The control method for the smart home of claim 9, further comprising:

obtaining and displaying a preferred display configuration issued by the control server, wherein the preferred display configuration includes one or more graphical elements displayed on a display module of the controller, and the preferred display configuration is determined based on the operational habit data, wherein the one or more graphical elements correspond to one or more smart home devices.

11. The control method for the smart home of claim 9, further comprising:

displaying status information and a monitoring parameter of one or more smart home devices.

12. A control system for a smart home, comprising a controller, a control server, a collaborative server, a smart home cloud server, and a plurality of smart home devices connected sequentially, wherein the controller includes an interaction module and a communication module, wherein the interaction module includes at least one of a button unit and a sliding unit, wherein the controller is configured to obtain a control command based on the interaction module and upload the control command to the control server via the communication module, wherein the control command is configured to control a target smart home device;

the control server is configured to format the control command to obtain command data and transmit the command data to the collaborative server;

the collaborative server is configured to transmit the command data to the smart home cloud server;

the smart home cloud server is configured to, based on the command data, control the target smart home device among the plurality of smart home devices to execute a responsive operation; and the plurality of smart home devices are configured to feedback a control result to the smart home cloud server based on an execution result of the responsive operation;

wherein the controller is further configured to:

determine the target smart home device from the plurality of smart home devices based on operational data of a user; and determine an adjustment range and an adjustment sensitivity of the sliding unit based on a current parameter value and a parameter value distribution of the target smart home device, wherein to determine the adjustment sensitivity, the controller is further configured to:

determine the adjustment sensitivity of the sliding unit based on the current parameter value of the target smart home device, the parameter value distribution of the target smart home device, a signal strength feature of a current location of the controller, and a risk of a circuit or device abnormality in a future time period, wherein the risk of the circuit or device abnormality in the future time period is determined through an abnormality prediction model, and the abnormality prediction model is a machine learning model.

13. The control system for the smart home of claim 12, wherein the controller is configured to:

determine the control command based on the operational data of the user, wherein the operational data includes at least one of sliding data and click data.

14. The control system for the smart home of claim 13, wherein the controller is configured to:

determine operational habit data based on the operational data; and upload the operational habit data to the control server.

15. The control system for the smart home of claim 14, wherein the control server is configured to:

determine an operational behavior distribution based on the operational habit data uploaded by the controller within a preset period; and determine a preferred display configuration based on the operational behavior distribution and issue the preferred display configuration to the controller, the preferred display configuration including one or more graphical elements to be displayed, wherein the one or more graphical elements correspond to one or more smart home devices.

16. The control system for the smart home of claim 15, wherein the controller is configured to:

obtain and display the preferred display configuration issued by the control server.

17. The controller for the smart home of claim 3, wherein the preferred display configuration is determined by the control server based on an operational behavior distribution, wherein the operational behavior distribution includes a time distribution or a location distribution of historical operations of a user on smart home devices.

18. The controller for the smart home of claim 17, wherein the preferred display configuration is determined by the control server based on an operational behavior distribution, including:

using a historical operational behavior distribution of the user to estimate one or more smart home devices with a highest probability of user operation at a current time or a current location and determining the preferred display configuration corresponding to the one or more smart home devices.

* * * * *